(12) United States Patent
Fuchs

(10) Patent No.: US 6,191,899 B1
(45) Date of Patent: Feb. 20, 2001

(54) EMERGENCY VISUAL ASSISTANCE DEVICE

(76) Inventor: Jan Peter Fuchs, 18 Washbrook Rd., Newtown, CT (US) 06470

( * ) Notice: Under 35 U.S.C. 154(b), the term of this patent shall be extended for 0 days.

(21) Appl. No.: 09/451,878

(22) Filed: Dec. 1, 1999

Related U.S. Application Data
(60) Provisional application No. 60/111,365, filed on Dec. 8, 1998.

(51) Int. Cl.[7] .............................. G02B 27/00; G02B 5/00; G02B 7/00
(52) U.S. Cl. ..................... 359/894; 359/895; 359/436; 359/440; 359/507; 359/511; 206/803; 362/208; 362/120; 362/379
(58) Field of Search .................................. 359/894, 895, 359/436, 440, 441, 442, 507, 509, 511, 798, 799, 809; 128/201.15; 244/118.5, 129.2; 206/803; 315/33, 86; 362/208, 120, 379

(56) References Cited

U.S. PATENT DOCUMENTS

| | | | |
|---|---|---|---|
| 2,730,921 | * | 1/1956 | Little ...................................... 359/895 |
| 3,335,607 | * | 8/1967 | Seekins ................................. 359/894 |
| 4,515,437 | * | 5/1985 | Story ..................................... 359/894 |
| 4,643,523 | * | 2/1987 | Smedley ............................... 359/895 |
| 4,832,287 | | 5/1989 | Werjefelt . |
| 5,202,796 | | 4/1993 | Werjefelt . |
| 5,318,250 | | 6/1994 | Werjefelt . |
| 5,491,589 | * | 2/1996 | Haymond ............................. 359/895 |
| 5,947,415 | | 9/1999 | Werjefelt . |
| 6,023,382 | * | 2/2000 | Hollingsworth ..................... 359/895 |

* cited by examiner

Primary Examiner—Cassandra Spyrou
Assistant Examiner—Leo Boutsikaris

(57) ABSTRACT

An emergency visual assistance device which provides an operator at an operator station access to operationally necessary visual information when that visual information is obscured by smoke or other vision-obstructing matter, and a method for using that device. In the device's basic version, a transparent panel is attached to either end of an elongated rigid hollow spacer tube in a manner which provides a substantially airtight seal. The preferred embodiment includes flexible skirts at each end of the device, and an illumination means mounted within the device. The flexible skirts serve mainly to exclude smoke from the operator's visual pathway, and the illumination means provides light for illuminating the visual information.

20 Claims, 7 Drawing Sheets

EMERGENCY VISUAL ASSISTANCE DEVICE

CROSS REFERENCES TO RELATED APPLICATIONS

This application references and is entitled to the benefit of Provisional Patent Application Serial No. 60/111,365 filed Dec. 8, 1998.

BACKGROUND

1. Field of the Invention

This invention relates to an emergency visual assistance device which provides an operator at an operator station access to operationally necessary visual information when that visual information is obscured by smoke or other vision-obstructing matter.

2. Description of the Related Art

In spite of the long history of smoke and fire emergencies aboard aircraft in flight, tragedies with substantial loss of life are still occurring on a regular basis simply because an aircraft cockpit becomes filled with vision-obstructing smoke. In too many of these situations, the inability of the flight crew to see through the smoke causes the flight crew to lose control of the aircraft. This is because they can no longer see the aircraft's instruments, or see outside the aircraft's cockpit. In addition, even when a flight crew can maintain control of the aircraft under these conditions, limited visibility often prevents the flight crew from taking the corrective actions necessary to halt the ingress of smoke into the cockpit. Thick smoke prevents the flight crew from reading emergency checklists, or from operating the switches, circuit breakers, and other controls called out by these checklists.

There are only four patents, all by Werjefelt [U.S. Pat. No. 4,832,287 (1989), U.S. Pat. No. 5,202,796 (1993), U.S. Pat. No. 5,318,250 (1994), and U.S. Pat No. 5,947,415 (1999)], that attempt to address the need for continued access to visual information in an enclosed smoke-filled environment. Werjefelt's patents all relate to inflatable systems that have an undeployed and deployed state. These systems suffer from several disadvantages:

(a) These devices are actually complex mechanical systems, with various mechanical, electrical, and pneumatic components that are subject to mechanical failure and inspection intervals.

(b) The major component of the prior art is a flexible plastic material that can be vulnerable to puncture or tearing. Such a defect during use would make the device useless.

(c) These devices have a deployed and undeployed state. In an emergency situation where contaminants are invading the visual field, these inflatable devices must be manipulated from a storage container and deployed using a compressed gas cylinder or pump before they are functional for the purpose they are designed for. This requires precious time and effort from the flight crew.

(d) These devices are large and bulky in the deployed state, and are not designed to be maneuverable over and around obstructions, such as flight control yokes, power levers, etc. This makes identification and manipulation of many switches and circuit breakers, which are often located above or behind a pilot's head, difficult if not impossible.

(e) These devices have proven quite expensive to manufacture. Because each device is custom-manufactured for the aircraft type and pilot seat position it is to be used in, the cost to produce and purchase these devices is high.

(f) These devices are relatively heavy in comparison to other items of emergency equipment typically carried in an aircraft cockpit. Weight is a critical factor in any decision involving the selection of aircraft equipment, and there is no requirement that aircraft operators carry any device which allows the pilot to see in heavy smoke.

The devices described in the prior art have been designed primarily to allow for the viewing of the instrumentation immediately in front of the pilot and the environment outside an aircraft's windows. They have not focused on the need to complete tasks inside the aircraft.

One element of Werjefelt's invention illustrated in U.S. Pat. No. 4,832,287 (1989) is a hand-held device that would appear to serve a similar function as this invention. However, the description of the device states that it is an inflatable component, not readily usable without first being deployed, and that it is to be used in conjunction with other elements of the invention. Werjefelt also describes it as having a handle that when inflated, would make the component vulnerable to ripping or tearing.

SUMMARY OF THE INVENTION

The present invention is an elongated rigid hollow spacer of predetermined crosssection and length, sealed on both ends with transparent panels. When held and/or positioned between the eyes of an operator and a source of visual information, it provides a clear visual pathway through smoke or other vision-obstructing matter. The sources of visual information necessary to an operator typically include instrument displays, controls, switches, handles, and printed materials. In an aircraft, an operator might also require access to visual information outside the cockpit. The present invention can fulfill that requirement by creating a clear visual pathway between the operator and the aircraft windshield.

In the preferred embodiment, the present invention also includes a flexible skirt at either end, and an illumination means mounted inside the elongated rigid hollow spacer.

The flexible skirts provide an adapter of sorts at either end of the device, and are for excluding smoke from the operator's visual pathway. The skirt at the operator's end of the device is placed against the operator's smoke goggles, or against the operator's face. The skirt at the other end of the device is placed on or near what the operator wants to see.

The illumination means provides the operator with a built-in source of light, and can be switched on when a lack of ambient light makes it difficult for the operator to see objects with the device.

Several of the Objects and Advantages of this Invention are:

(a) To provide an emergency visual assistance device which is mechanically simple, reliable, and has no moving parts upon which the functionality of the device depends;

(b) To provide an emergency visual assistance device that is constructed from rigid, rugged materials which are unlikely to be damaged—either before the device is used, or during actual use of the device;

(c) To provide an emergency visual assistance device that is always ready for use, and requires no inflation, deployment, or other preliminary steps before it can be effective;

(d) To provide an emergency visual assistance device that is readily positionable and repositionable to provide an operator with an unobstructed view of whatever sources of visual information he/she deems necessary;

(e) To provide an emergency visual assistance device that is inexpensive to manufacture; and (f) To provide an emergency visual assistance device that is lightweight. Further objects and advantages will become apparent from a consideration of the ensuing drawings and description.

BRIEF DESCRIPTION OF THE DRAWINGS

In the drawings, closely related figures have the same number but different alphabetic suffixes.

Figure 1:
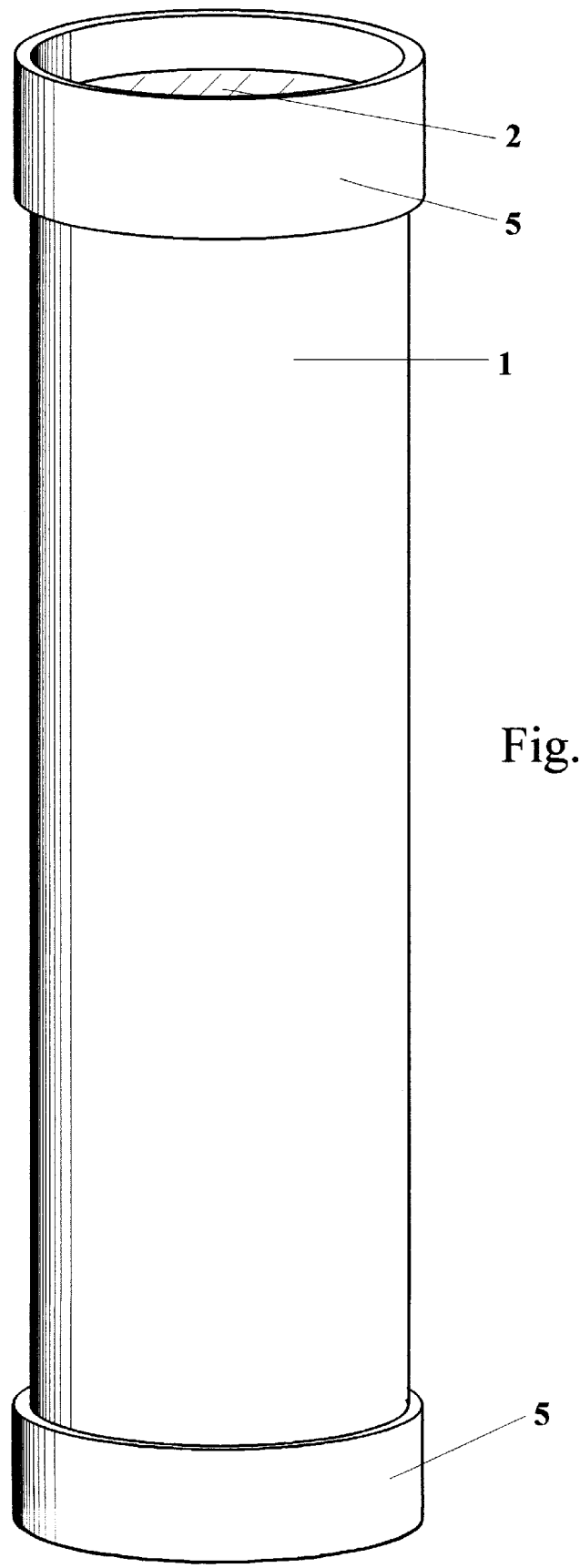
FIG. 1 is an exploded perspective view of a basic version of the emergency visual assistance device.

Reference Numerals in Drawings 1 elongated rigid hollow spacer tube
2 transparent panel
2a transparent panel (of smaller diameter than transparent panel of Reference Numeral 2)
3 O-ring
3a O-ring (of smaller diameter than O-ring of Reference Numeral 3)
4 end cap
4a end cap (of smaller diameter than end cap of Reference Numeral 4)
5 flexible skirt
5a flexible skirt (of smaller diameter than flexible skirt of Reference Numeral 5)
6 switch
7 switch/battery housing
8 light emitting diode
9 conductive material
10 batteries
11 barrel
12 gasket material
13 casing

DETAILED DESCRIPTION
Description—FIGS. 1 to 7

FIG. 1 is an exploded perspective view of a basic version of the emergency visual assistance device. A transparent panel 2 is attached to either end of an elongated rigid hollow spacer tube 1 in a manner which provides a substantially airtight seal. In this basic version of the emergency visual assistance device, the transparent panels 2 are secured to the spacer tube 1 with a high-strength adhesive. The spacer tube 1 consists of a hollow length of rigid, inflexible material.

In the preferred embodiment, spacer tube 1 is a translucent plastic tube which is matte finished on both the inside and outside surfaces. The matte finish allows the admission of ambient light into the spacer tube 1 while minimizing tube reflections of the visual information. The matte finish is particularly helpful in viewing instruments in modem aircraft cockpits, which rely heavily on cathode ray tube displays, and the like, to present information to the flight crew. Utilizing plastic for the spacer tube 1 helps produce a strong, lightweight device which an operator may rely on during extended use without suffering from fatigue. Impregnating the spacer tube 1 with a luminescent material will aid the operator in locating the device in contaminated atmospheric environments; the same benefit is obtained when some portion of the outside of spacer tube 1 is coated with a light-reflective material.

Figure 2:
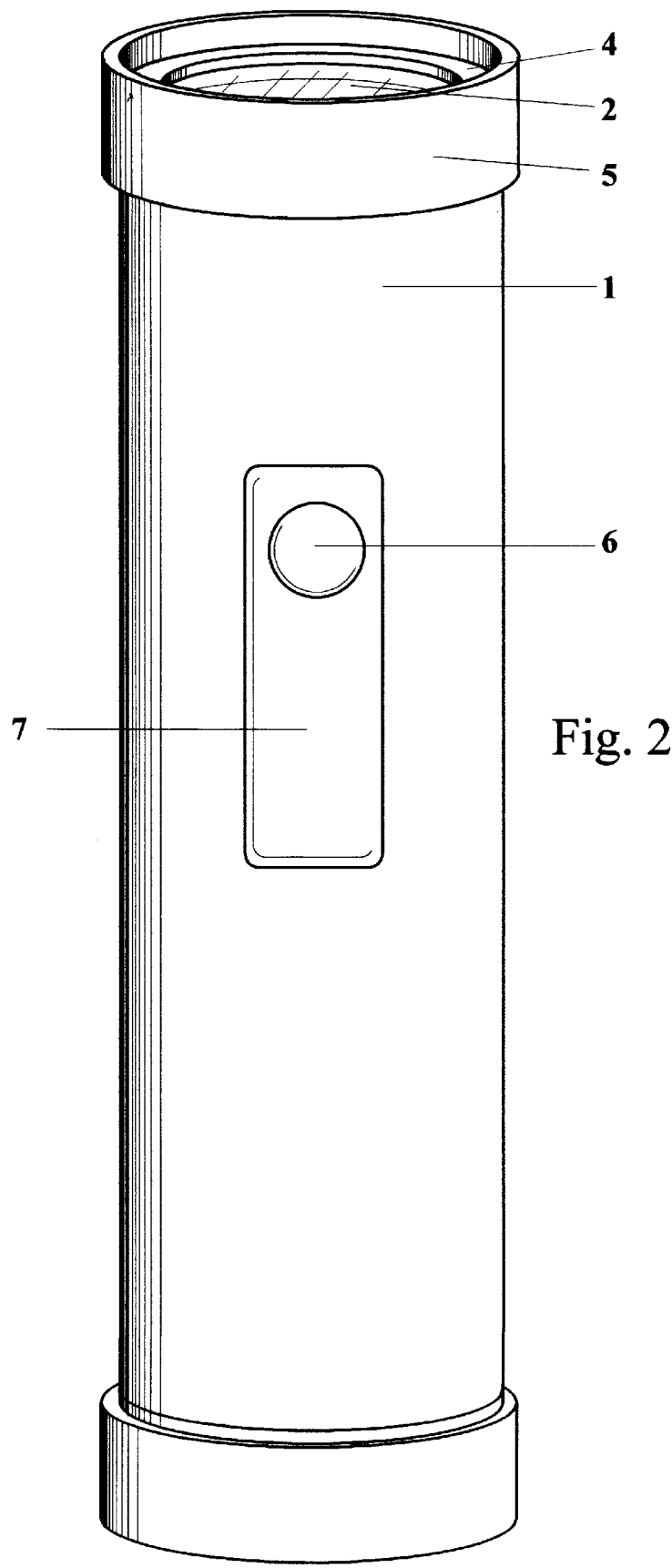
FIG. 2 is a perspective view of the preferred embodiment of the emergency visual assistance device.

FIG. 2 is a perspective view of the preferred embodiment of the emergency visual assistance device. The spacer tube 1 is a translucent plastic tube which has been matte finished on both the inside and outside surfaces, and is threaded at each end for a sufficient length as to allow the securing of the threaded end caps 4. In the preferred embodiment, the transparent panels 2 are lightweight thermoplastic. The end caps 4 are aluminum; good results will also be obtained with end caps constructed from plastic. The end caps 4 thread onto the spacer tube 1 and secure a transparent panel 2 to each end of the spacer tube 1. Additionally, a supplemental light source is mounted within the spacer tube 1, controlled by a switch 6, and powered by an electrical power supply within the switch/battery housing 7, which is attached to the outside of the spacer tube 1.

FIG. 2 also shows flexible skirts 5 at each end of the emergency visual assistance device. These flexible skirts 5 serve mainly to exclude smoke from the operator's visual pathway. The flexible skirt 5 at the operator's end of the device is placed against the operator's smoke goggles, or against the operator's face. The flexible skirt 5 at the other end of the device is placed on or near what the operator wants to see. When used in this manner, the flexible skirts 5 provide the operator with the best smoke-excluding seal possible (under the existing circumstances) at each end of the emergency visual assistance device. When properly placed by the operator, the flexible skirts 5 also block glaring light that may interfere in the viewing of some objects.

In the preferred embodiment, the flexible skirts 5 are silicone rubber tubes about 5 centimeters in length, and are slightly smaller in diameter than the end caps 4. The flexible skirts 5 are simply stretched and slipped over the end caps 4, and are retained on the end caps by friction. In the preferred embodiment, the flexible skirts 5 extend about 2.5 centimeters beyond the end caps 4 at each end of the device.

Figure 3:
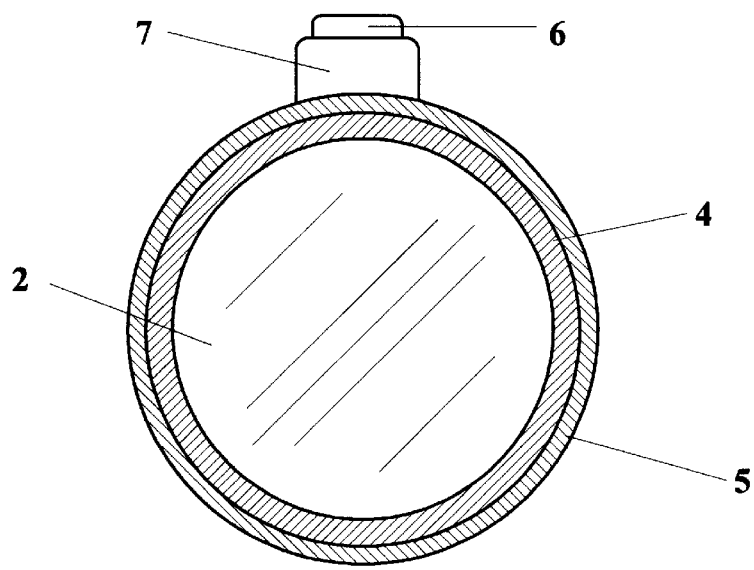
FIG. 3 is an end elevation view of the emergency visual assistance device of FIG. 2.

FIG. 3 is an end elevation view of the emergency visual assistance device of FIG. 2. In FIG. 3, the round transparent panel 2 is secured in position by end cap 4. The flexible skirt 5 is shown fitted around the periphery of end cap 4. FIG. 3 also shows an end elevation view of the switch 6 installed in the switch/battery housing 7. In the preferred embodiment, the switch/battery housing 7 is constructed of plastic, and secured to the outer surface of spacer tube 1 using a silicone-based adhesive. It is not advisable to secure the switch/battery housing 7 to the spacer tube 1 using a high-strength adhesive, as the switch/battery housing 7 may have to be removed at some time to allow access to the components concealed within it.

Figure 3A:
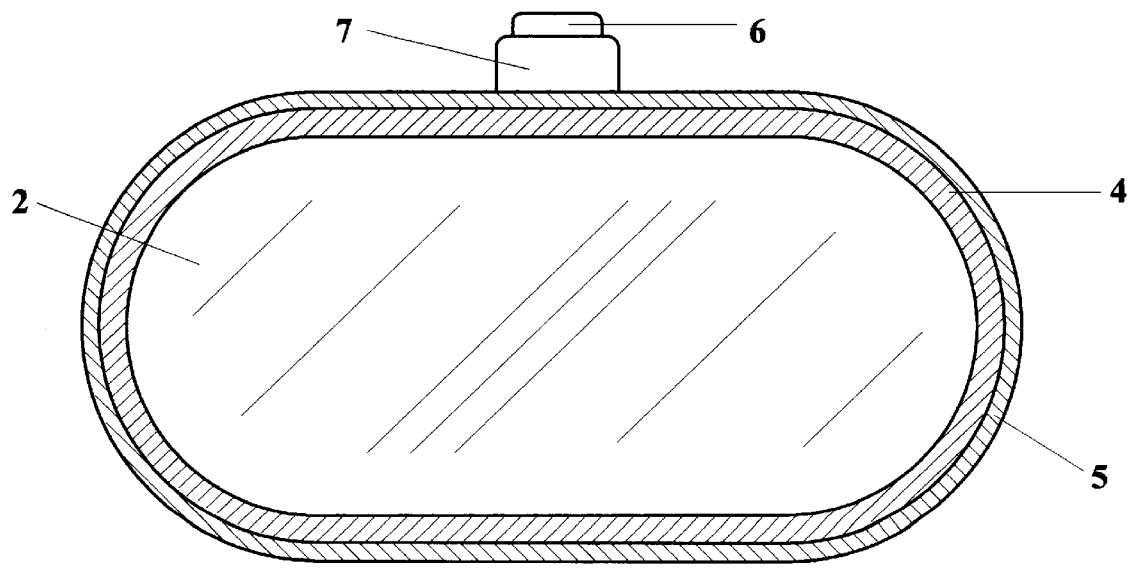
FIG. 3a is an end elevation view of an alternative embodiment of the emergency visual assistance device; this alternative embodiment has been designed for binocular, rather than monocular, viewing.

FIG. 3a is an end elevation view of an alternative embodiment of the emergency visual assistance device. In FIG. 3a, the transparent panel 2 is substantially oval so as to permit binocular viewing through the invention; end cap 4 and flexible skirt 5 are similarly oval in shape. FIG. 3a also shows an end elevation view of the switch 6 installed in the switch/battery housing 7.

Figure 4:
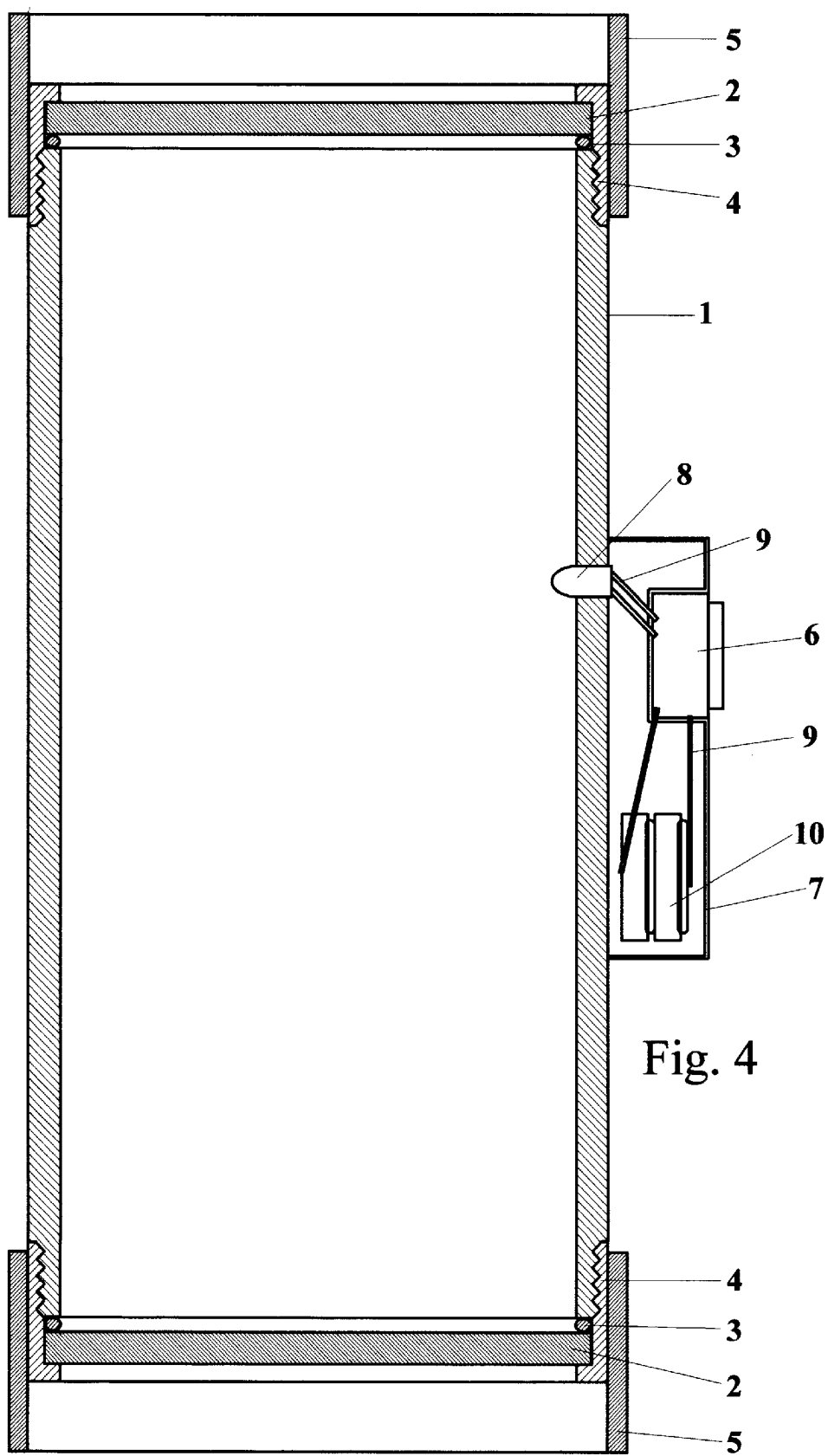
FIG. 4 is a cross-section view of the emergency visual assistance device of FIG. 2.

FIG. 4 is a cross-section view of the emergency visual assistance device of FIG. 2. In FIG. 4, the substantially airtight seal formed by sandwiching an O-ring 3 between each transparent panel 2 and the threaded spacer tube 1 is maintained by the internally threaded end caps 4. The flexible skirts 5 are shown extending beyond the end caps 4.

FIG. 4 also shows the details of the device's lighting system. A hole has been bored in spacer tube 1, and a light emitting diode 8 has been inserted in that hole, to provide supplemental light for the operator as he views objects through the device. The light emitting diode 8 is secured in the hole in spacer tube 1 with a high-strength adhesive. Conductive material 9 electrically connects the light emitting diode 8 to the batteries 10 through the switch 6. In the preferred embodiment, switch 6 is a normally open contact switch, and current flows from the batteries to the light emitting diode only when the switch is depressed by the operator. In the preferred embodiment, the batteries 10 are two 3 volt miniature batteries, of a type which are widely used commercially for miniature electronic devices. The switch 6 is installed in the switch/battery housing 7; the switch/battery housing 7 also serves to conceal the light emitting diode 8, the conductive material 9, and the batteries 10.

Figure 5:
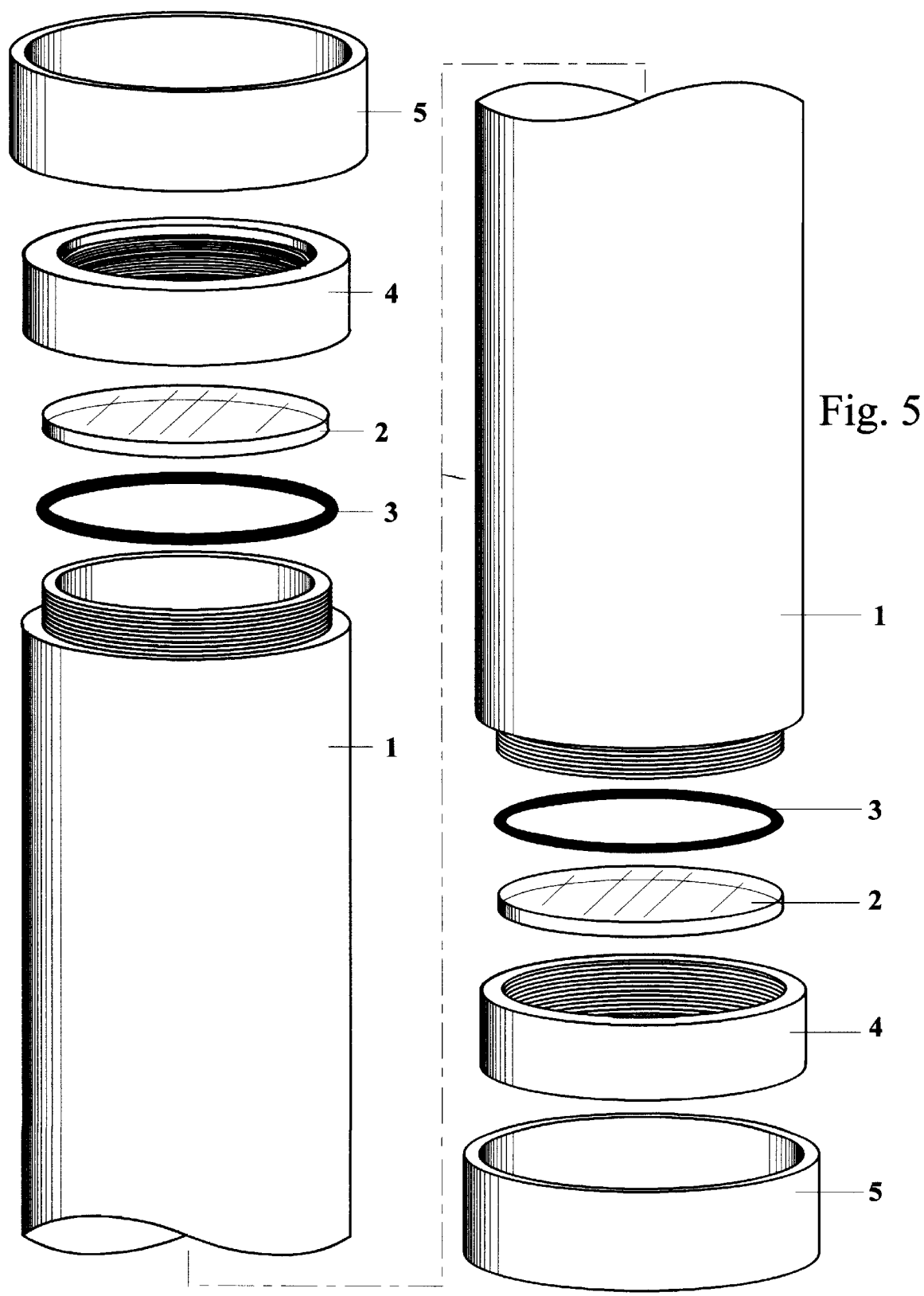
FIG. 5 is an exploded view of the emergency visual assistance device of FIG. 2, with light assembly omitted for clarity.

FIG. 5 is an exploded view of the emergency visual assistance device of FIG. 2, with the light assembly omitted for clarity. FIG. 5 shows the O-rings 3 sandwiched between the spacer tube 1 and the transparent panels 2, and that the transparent panels 2 and the O-rings 3 are secured in place by the end caps 4. It also shows the flexible skirts 5, which slip over each end cap 4.

Figure 6:
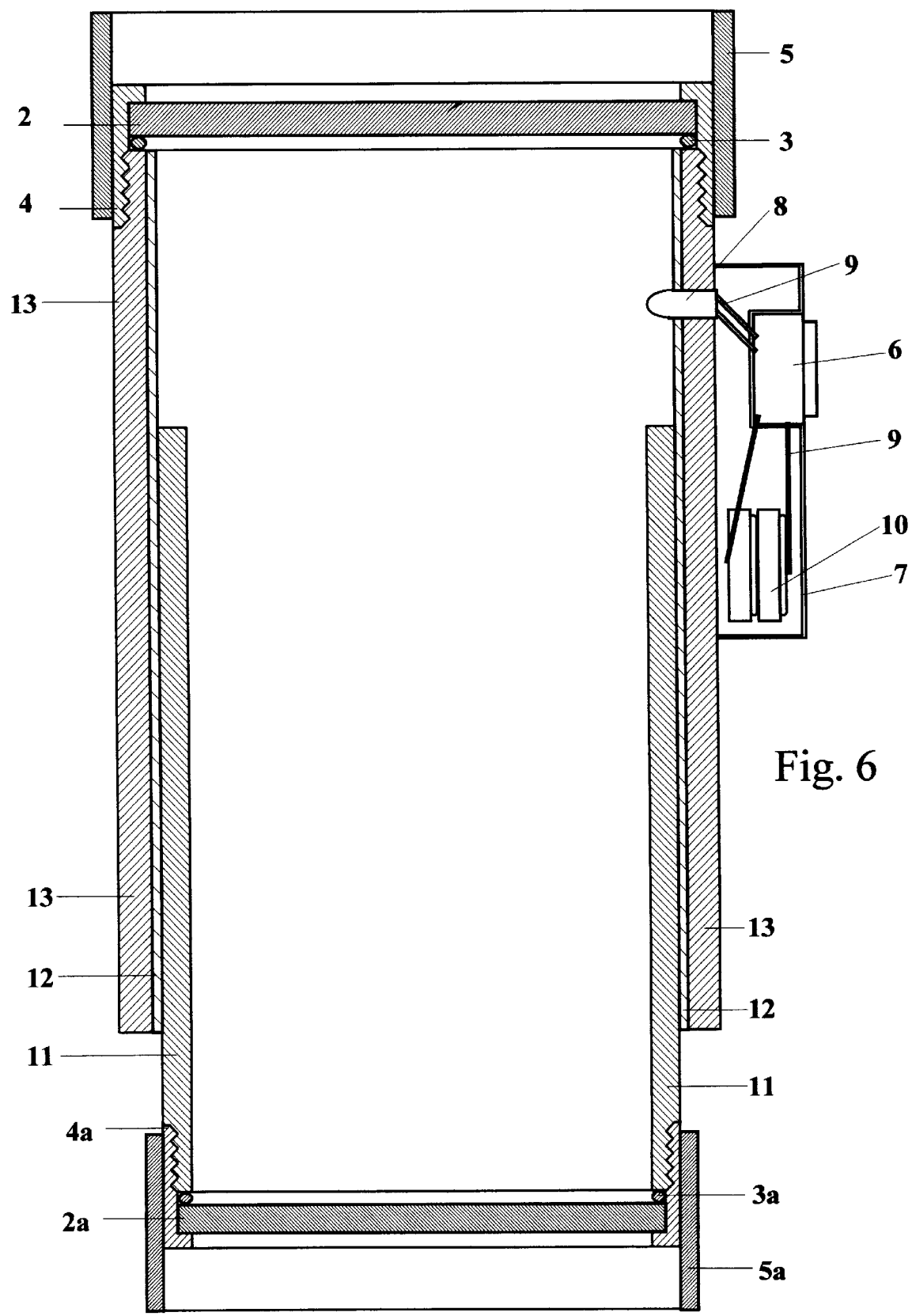
FIG. 6 is a cross-section view of a dynamically expandable embodiment of the emergency visual assistance device.

FIG. 6 is a cross-section view of a dynamically expandable embodiment of the emergency visual assistance device. Except for the construction of the spacer tube, it is basically the same device shown in FIGS. 2 to 5. However, in FIG. 6, the one-piece spacer tube of FIGS. 2 to 5 is replaced by a two-piece telescoping spacer. One part of this two piece spacer is a casing 13, which has a sealing O-ring 3, a transparent panel 2, an end cap 4, and a flexible skirt 5 fitted on one end, and is open on the other end. The other part of this twopiece spacer is a barrel 11, which has a sealing O-ring 3a, a transparent panel 2a, an end cap 4a, and a flexible skirt 5a fitted on one end, and is open on the other end.

O-ring 3a, transparent panel 2a, end cap 4a, and flexible skirt 5a are identical in function and highly similar in construction to O-ring 3, transparent panel 2, end cap 4, and flexible skirt 5, respectively. However, O-ring 3a, transparent panel 2a, end cap 4a, and flexible skirt 5a are slightly smaller in diameter than O-ring 3, transparent panel 2, end cap 4, and flexible skirt 5, respectively. This is because the barrel 11 is slightly smaller in diameter than the casing 13, which allows the barrel 11 and the casing 13 to interfit telescopically.

In FIG. 6, the inner surface of the casing 13 is lined with gasket material 12, which is for preventing the ingress of smoke into the emergency visual assistance device, while still allowing the casing 13 and barrel 11 to move freely relative to one another. Felt is suitable for the gasket material 12; however, any material which is capable of filtering out visionobstructing obstructing matter might be used.

FIG. 6 also shows the light emitting diode 8 electrically connected to the batteries 10 through the switch 6 by conductive material 9. In FIG. 6, an opening has been made in the gasket material 12 to accommodate the light emitting diode 8. The switch 6 is shown mounted to the switch/battery housing 7.

Figure 7:
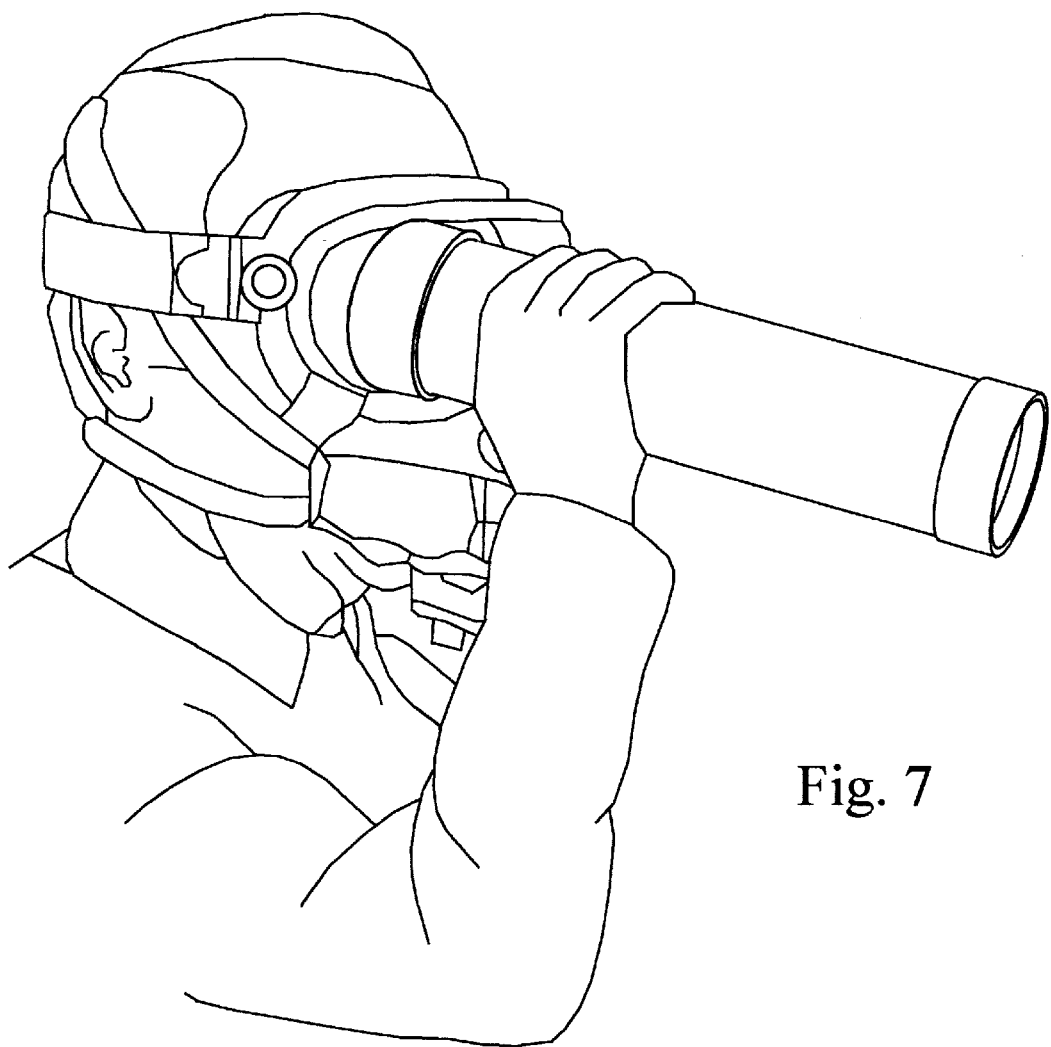
FIG. 7 is a perspective view of an operator holding the emergency visual assistance device of FIG. 2, as it would typically be utilized.

FIG. 7 illustrates an operator, wearing common smoke goggles and an oxygen mask, while holding the emergency visual assistance device. Typically, a jet aircraft flight crew member would use the device in this manner during a smoke emergency. Flight crew members would don oxygen masks and smoke goggles at the first sign of smoke. The emergency visual assistance device would then be used as soon as the smoke became thick enough to block access to necessary visual information.

Operation—FIGS. 4, 6, 7

The present invention is a ready-to-use visual conduit that requires no donning, inflation, focusing, or attaching. When held and/or positioned between the eyes of an operator and a source of visual information, it provides a clear visual pathway through smoke or other vision-obstructing matter. FIG. 7 depicts an operator properly using the preferred embodiment of the emergency visual assistance device; that operator is simply holding the device and looking through it.

The preferred embodiment of the emergency visual assistance device incorporates the flexible skirts 5 at each end of the emergency visual assistance device, as depicted in FIGS. 4, 6, and 7. These flexible skirts 5 serve mainly to exclude smoke from the operator's visual pathway. The flexible skirt 5 at the operator's end of the device is placed against the operator's smoke goggles, or against the operator's face. The flexible skirt 5 at the other end of the device is placed on or near what the operator wants to see. When used in this manner, the flexible skirts 5 provide the operator with the best smoke-excluding seal possible (under the existing circumstances) at each end of the emergency visual assistance device. The flexible skirts 5 may also be used by the operator to block glaring light that may interfere in the viewing of some objects.

The preferred embodiment of the emergency visual assistance device also incorporates a lighting system which may be used by the operator to improve his ability to see through the device in conditions of low ambient light. To turn the light on, the operator simply depresses and holds FIG. 4's switch 6.

The embodiment of the emergency visual assistance device shown in FIG. 6 has a barrel 11 which interfits telescopically with a casing 13. This feature may be used to adjust the length of the device while in use, and to minimize its length for storage. The length of the device is adjusted simply by pushing the barrel 11 and casing 13 together, or by pulling the barrel II and casing 13 in opposite directions.

CONCLUSION, RAMIFICATIONS, AND SCOPE

The present invention is an emergency visual assistance device which provides an operator at an operator station access to operationally necessary visual information when that visual information is obscured by smoke or other vision-obstructing matter. Though the device was designed to be used by flight crews in aircraft cockpits, it may be used by any operator when access to operationally necessary visual information is impeded by smoke or smoke-like conditions.

The emergency visual assistance device provides the first simple solution to the longstanding problem of smoke emergencies in aircraft cockpits. Because it is mechanically simple and constructed of rugged materials, the device is reliable, and unlikely to fail in an emergency situation. Unlike the inflatable devices previously available, there is no preliminary step, like deployment, which must be successfully completed for the device to be useful. The present invention also differs from the previously available inflatable devices in that it is inexpensive to manufacture, lightweight, and does not have to be custom-fitted to various aircraft cockpits. Furthermore, a flight crew member can manipulate the emergency visual assistance device as necessary to read printed matter, and to accomplish tasks in all parts of the cockpit. This type of capability, which is not provided by the inflatable devices, may be the key to solving a smoke emergency, and halting the ingress of smoke into the cockpit.

Although the description above contains many specificities, these should not be construed as limiting the scope of the invention but as merely providing illustrations of some of the presently preferred embodiments of this invention. The scope of the invention should be determined by the appended claims and their legal equivalents, rather than by the examples given.

For example, though FIG. 1 and FIG. 3 show a device based on circular transparent panels and a cylindrical spacer tube, the transparent panels may be of any geometric shape, with the elongated rigid hollow spacer shaped to match. Additionally, many methods may be used to join the spacer tube to the transparent panels: adhesives; thermal bonding; end caps that that retain the transparent panels and threadably connect to the spacer tube; transparent panels that thread into the spacer tube; press fitting of the transparent panels into the spacer tube; retaining clips mounted to the spacer tube that retain the transparent panels in place; or rubber grommets mounted to the ends of the spacer tube that retain the transparent panels in place.

Though in the preferred embodiment the transparent panels are constructed of lightweight thermoplastic, shatterproof glass might also be used, or magnifying lenses. Additionally, the transparent panels might be coated with a commercially available anti-fogging compound.

Thus the scope of the invention should be determined by the appended claims and their legal equivalents, rather than by the examples given.

I claim:

1. An emergency visual assistance device for use in environments contaminated with smoke, or other vision-obstructing matter, comprising:
   a. a plurality of transparent panels of predetermined shape and thickness; and
   b. a matte-finished translucent elongated rigid hollow spacer means, to which said transparent panels are mounted at either end so as to form a visual pathway of predetermined length; and
   c. a sealant means disposed between said matte-finished translucent elongated rigid hollow spacer means and said transparent panels for providing a substantially airtight seal between said matte-finished translucent elongated rigid hollow spacer means and said transparent panels; and
   d. a flexible, substantially airtight skirt mounted at either end of the assembly formed by the combination of said transparent panels, said matte-finished translucent elongated rigid hollow spacer means, and said sealant means, for forming a substantially sealed visual pathway between the operator and the visual information.

2. An emergency visual assistance device as claimed in claim 1, wherein said matte-finished translucent elongated rigid hollow spacer means is plastic.

3. An emergency visual assistance device as claimed in claim 2, further comprising an illumination means mounted within said matte-finished translucent elongated rigid hollow spacer means for illuminating the visual information.

4. An emergency visual assistance device as claimed in claim 3, wherein said illumination means comprises:
   a. a light emitting diode mounted to the inside wall of said matte-finished translucent elongated rigid hollow spacer means;
   b. a means for selectively supplying electrical power to said light emitting diode, said means for selectively supplying electrical power being mounted to the outside wall of said matte-finished translucent elongated rigid hollow spacer means.

5. An emergency visual assistance device as claimed in claim 1, wherein said matte-finished translucent elongated rigid hollow spacer means is a substantially cylindrical tube.

6. An emergency visual assistance device as claimed in claim 5, wherein said substantially cylindrical tube is plastic.

7. An emergency visual assistance device as claimed in claim 6, wherein said sealant means comprises O-rings positioned on either end of said tube, said tube further comprises external threads formed adjacent to either end of said tube, and said sealant means further comprises internally threaded end caps threadably connected to either end of said tube, whereby a seal formed by sandwiching said O-rings between said tube and said transparent panels is maintained by said internally threaded end caps which retain said transparent panels.

8. An emergency visual assistance device as claimed in claim 7, further comprising an illumination means mounted within said substantially cylindrical tube.

9. An emergency visual assistance device as claimed in claim 8, wherein said illumination means comprises:
   a. a light emitting diode mounted to the inside wall of said matte-finished translucent elongated rigid hollow spacer means;
   b. a means for selectively supplying electrical power to said light emitting diode, said means for selectively supplying electrical power being mounted to the outside wall of said matte-finished translucent elongated rigid hollow spacer means.

10. An emergency visual assistance device as claimed in claim 9, wherein said means for selectively supplying electrical power comprises:
   a. batteries for supplying electrical power to said light emitting diode;
   b. connection means for electrically connecting said light emitting diode to said batteries;
   c. switch means coupled to said connection means for selectively interrupting said connection means when said connection means electrically connects the light emitting diode to the batteries; and
   d. housing means mounted to the outside wall of said matte-finished translucent elongated rigid hollow spacer means for housing said batteries, said switch means, and said connection means.

11. An emergency visual assistance device as claimed in claim 1, wherein said matte-finished translucent elongated rigid hollow spacer means comprises:
   a. a hollow, substantially cylindrical casing having an open end and an end adapted for mounting one of said transparent panels;

b. a hollow, substantially cylindrical barrel having an open end that telescopically interfits with the open end of said casing and an end adapted for mounting one of said transparent panels; and c. a gasket material between the telescoped surfaces of the casing and the barrel to prevent the penetration of vision-obstructing matter into the interior of the emergency visual assistance device.

12. An emergency visual assistance device as claimed in claim 11, wherein said casing and said barrel are plastic.

13. An emergency visual assistance device as claimed in claim 12, further comprising an illumination means mounted within said casing.

14. An emergency visual assistance device as claimed in claim 13, wherein said illumination means comprises:

a. a light emitting diode mounted to the inside wall of said matte-finished translucent elongated rigid hollow spacer means;

b. a means for selectively supplying electrical power to said light emitting diode, said means for selectively supplying electrical power being mounted to the outside wall of said matte-finished translucent elongated rigid hollow spacer means.

15. An emergency visual assistance device as claimed in claim 1, wherein said matte-finished translucent elongated rigid hollow spacer means is substantially oval in cross-section.

16. An emergency visual assistance device as claimed in claim 15, wherein said matte-finished translucent elongated rigid hollow spacer means is plastic.

17. An emergency visual device as claimed in claim 16, wherein said matte-finished translucent elongated rigid hollow spacer means comprises:

a. a hollow, substantially oval casing having an open end and an end adapted for mounting one of said transparent panels;

b. a hollow, substantially oval barrel having an open end that telescopically interfits with the open end of said casing and an end adapted for mounting one of said transparent panels; and c. a gasket material between the telescoped surfaces of the casing and the barrel to prevent the penetration of vision-obstructing matter into the interior of the emergency visual assistance device.

18. An emergency visual assistance device as claimed in claim 17, further comprising an illumination means mounted within said casing for illuminating the visual information.

19. An emergency visual assistance device as claimed in claim 18, wherein said illumination means comprises:

a. a light emitting diode mounted to the inside wall of said matte-finished translucent elongated rigid hollow spacer means;

b. a means for selectively supplying electrical power to said light emitting diode, said means for selectively supplying electrical power being mounted to the outside wall of said matte-finished translucent elongated rigid hollow spacer means.

20. An operator station emergency visual assistance method, for allowing an operator continued access to operationally necessary visual information when access to said visual information is blocked by smoke or other vision-obstructing matter, which comprises:

a. positioning an emergency visual assistance device between the eyes of the operator and said visual information thereby providing a clear visual pathway between the eyes of the operator and the visual information, b. said emergency visual assistance device having a plurality of transparent panels of predetermined shape and thickness, a matte-finished translucent elongated rigid hollow spacer means to which said transparent panels are mounted at either end so as to form a visual pathway of predetermined length, and a sealant means disposed between said matte-finished translucent elongated rigid hollow spacer means and said transparent panels for providing a substantially airtight seal between said matte-finished translucent elongated rigid hollow spacer means and said transparent panels, c. each end of the emergency visual assistance device having a flexible, substantially airtight skirt mounted, for forming a substantially sealed visual pathway between the operator and the visual information, d. said matte-finished translucent elongated rigid hollow spacer means of the emergency visual assistance device having an illumination means mounted within said spacer means the for illuminating the visual information, e. one end of the emergency visual assistance device being positioned as close as possible to the eyes of the operator, and f. the other end of the emergency visual assistance device being positioned as close as possible to the visual information.

* * * * *